United States Patent
Adragna et al.

(10) Patent No.: US 11,695,621 B2
(45) Date of Patent: Jul. 4, 2023

(54) CONTROL DEVICE AND METHOD FOR CONTROLLING A REDUNDANT CONNECTION IN A FLAT NETWORK

(71) Applicant: Schneider Electric Industries SAS, Rueil Malmaison (FR)

(72) Inventors: Jean-Jacques Adragna, Roquefort-les-Pins (FR); Kévin Barbier, La Colle-sur-Loup (FR); Antoine Brück, Nice (FR); Abhijith Erojirao, North Chelmsford, MA (US); Francisco Garcia Martin, Barcelona (ES); Yannick Buchet, Biot (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 144 days.

(21) Appl. No.: 16/752,968

(22) Filed: Jan. 27, 2020

(65) Prior Publication Data
US 2020/0244518 A1   Jul. 30, 2020

(30) Foreign Application Priority Data
Jan. 30, 2019 (EP) .................................... 19305111

(51) Int. Cl.
*H04L 41/0668* (2022.01)
*G06F 13/37* (2006.01)
(Continued)

(52) U.S. Cl.
CPC .......... *H04L 41/0668* (2013.01); *G06F 13/37* (2013.01); *H04L 41/0816* (2013.01); *H04L 41/0886* (2013.01); *H04L 49/351* (2013.01)

(58) Field of Classification Search
None
See application file for complete search history.

(56) References Cited

U.S. PATENT DOCUMENTS 7,032,029 B1 * 4/2006 Tanzman ............. G05B 19/058
                                                        710/10
8,244,838 B2 * 8/2012 Balasubramanian ... H04L 69/18
                                                        370/216
(Continued)

FOREIGN PATENT DOCUMENTS

WO     WO2016097459     6/2016

OTHER PUBLICATIONS

Extended European Search Report for European Patent Application No. 19305111.7 dated Sep. 27, 2019, 8 pages.

*Primary Examiner* — Derrick W Ferris
*Assistant Examiner* — Keith Follansbee
(74) *Attorney, Agent, or Firm* — Locke Lord LLP

(57) ABSTRACT

A control device having an integrated switch and being configured to logically enable and disable an Ethernet port of the integrated switch. Further disclosed is a device network consisting of at least two field devices, a primary control device and a primary switch, a secondary control device and a secondary switch, which are connected in a daisy chain loop topology. And wherein the secondary control device is configured to logically enable and disable an Ethernet port of the secondary switch. Further disclosed is a flat network consisting of such a device network. Further disclosed is a method for controlling a redundant connection in a flat network, consisting of detecting failure of the primary control device, initiating failover, enabling the Ethernet port of the secondary switch, and disabling the Ethernet port of the primary switch.

11 Claims, 4 Drawing Sheets

(51) Int. Cl.
*H04L 41/0816* (2022.01)
*H04L 41/08* (2022.01)
*H04L 49/351* (2022.01)

(56) References Cited

U.S. PATENT DOCUMENTS

| | | | |
|---|---|---|---|
| 10,116,517 B1* | 10/2018 | Drury | H04L 12/42 |
| 10,200,203 B2* | 2/2019 | Jones | H04L 12/40045 |
| 2006/0248377 A1* | 11/2006 | Tezcan | H04L 49/254 |
| | | | 714/4.1 |
| 2011/0264832 A1* | 10/2011 | Pettigrew | H04L 12/413 |
| | | | 710/316 |
| 2014/0341224 A1* | 11/2014 | Armbruster | H04L 49/30 |
| | | | 370/395.53 |
| 2020/0310394 A1* | 10/2020 | Wouhaybi | G06F 8/65 |

* cited by examiner

CONTROL DEVICE AND METHOD FOR CONTROLLING A REDUNDANT CONNECTION IN A FLAT NETWORK

The present invention relates to a method for controlling a redundant connection in a flat network and a system architecture enabling such control.

BACKGROUND

Industrial automation systems are provided to perform, control and supervise industrial processes. These automation systems are built from multiple devices, such as Programmable Logic Controllers (PLCs), Programmable Automation Controllers (PACs)), input/output devices (I/O devices), field devices (e.g., sensors and actuators), being interconnected via an Operational Technology OT-network i.e. industrial device network, using industrial protocols such as Modbus, ODVA EtherNet/IP, Profinet, etc. Such automation systems are also commonly connected to an enterprise Information Technology IT-network, i.e. control room network, which uses common IT protocols over TCP/IP and Ethernet IEEE 802.3 for exchange of data and signals with e.g. ERP-systems or other data management systems. These industrial automation systems and enterprise systems are commonly joined and supervised from a control room.

Referring to FIG. 1, a first example is shown of a configuration 100 wherein a control room network 110 is connected with an industrial device network 120. The control room network 110 includes a main computer system 111 and a Layer 2 switch 112. The device network includes two field devices 123, 124, a primary PLC 121, a secondary PLC 122 and a Layer 2 switch 125. The PLCs 121, 122 and field devices 123, 124 are connected in a daisy chain loop topology. Indicated in the FIGS. by square ports and cable links. The secondary PLC 122 is provided for reason of redundancy in case the primary PLC 121 should fail and aims to facilitate high availability of the control system. Apart from the connections for exchange of data within the network, the two PLCs 121, 122 are further connected via a dedicated link 128 to handle failover.

The device network 120 uses one of the known industrial protocol, such as Modbus, whereas the control network 110 uses a common IT protocol over IEEE 802.3 Ethernet. For the connection between switch 112 of the control network 110 and the switch 125 of the device network the Ethernet protocol is used. The switch 125 then provides the communication within the device network 120. As both PLCs are part of the same daisy chain, the switch 125 provides loop detection to prevent a so-called broadcast storm wherein communication messages are continuously forwarded. As indicated by black X in a port of field device 123.

In general, a switch operates at Layer 2 of the OSI model and is equipped with multiple ports for providing connections between various devices within a Local Area Network LAN. Various Protocols may be used for transmitting messages over IEEE 802.3, commonly referred to as Ethernet. Accordingly, ports of the switch may be referred to as Ethernet ports.

The configuration of FIG. 1 using only switches to interconnect, is commonly referred to as a flat network architecture which has the benefit of providing transparency and ease of control management. There is no hierarchical structure and no means for routing traffic. A drawback of the configuration 100 of FIG. 1 is that there is only one connection between the networks and that no further connection to improve redundancy can be added without increasing complexity to address the need for routing.

Referring to FIG. 2, a second example is shown of a configuration 200 wherein the control network 210 is connected with the device network 220. Again, the control network 210 includes the main computer system 211 and a switch 212. The device network includes two field devices 223, 224, a primary PLC 221 and a secondary PLC 222. The PLCs 221, 222 and field devices 223, 224 are connected in a daisy chain loop topology. Again, in order to facilitate high availability of the control system, the secondary PLC 222 is provided for reason of redundancy in case the primary PLC 221 should fail. And the two PLCs 121, 122 are further linked via a dedicated link 228 to handle failover.

No switch in the device network is present, and the primary PLC 221 and secondary PLC 222 are separately connected to the control room switch 212 increasing the level of redundancy and reducing the amount of equipment required. In this configuration loop detection now needs to be provided in the switch 212 to prevent broad cast storm. So, this requires the switch 212 to provide loop detection, such as e.g. by a Spanning Tree Protocol STP. A Spanning Tree Protocol aims to create a loop-free logical topology for Ethernet networks by disabling links not part of the tree. However, this introduces unwanted complexity and costs.

SUMMARY OF INVENTION

It is an object of the invention to provide redundant connections between a device network and a control network in a flat network architecture.

According to the invention, this object is achieved by providing a device network consisting of at least two field devices, a primary control device and a primary switch, a secondary control device and a secondary switch, which are connected in a daisy chain loop topology. And wherein the secondary control device is configured to logically enable and disable an Ethernet port of the secondary switch.

According to one aspect, there is provided a flat network consisting of a device network as disclosed and a control room network having a main computer system and a control room switch having at least two Ethernet ports. And wherein the Ethernet port of the primary switch and the Ethernet port of the secondary switch are respectively connected to the at least two Ethernet ports of the control room switch.

According to another aspect, there is provided a control device having an integrated switch and wherein the control device is configured to logically enable and disable an Ethernet port of the integrated switch.

According to yet another aspect, there is provided a method for controlling a redundant connection in a flat network, consisting of detecting failure of the primary control device, initiating failover, enabling the Ethernet port of the secondary switch, and disabling the Ethernet port of the primary switch.

Further objects, aspects, effects and details of particular embodiments of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawings, wherein.

DETAILED DESCRIPTION

Figure 3:
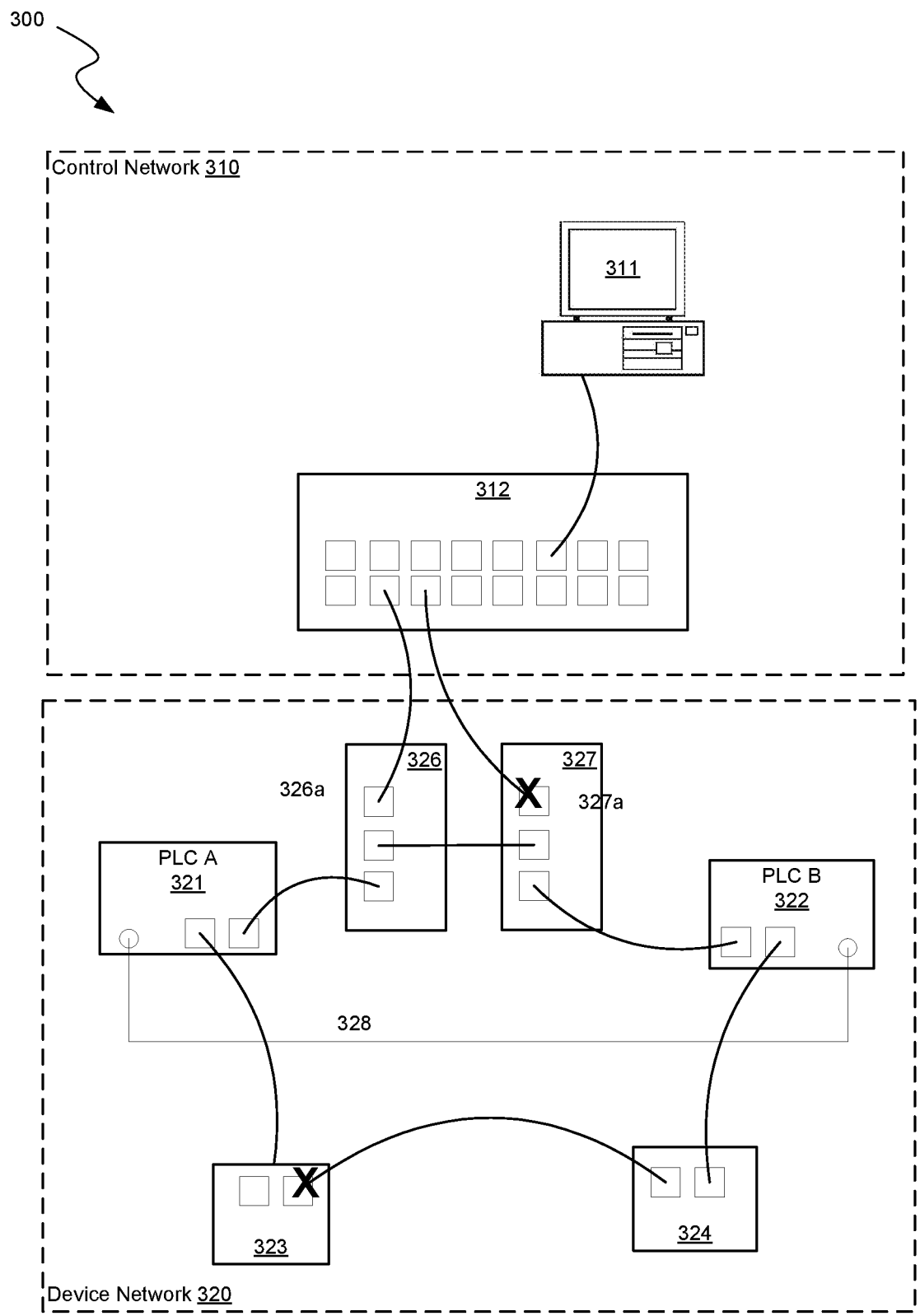
FIG. 3 illustrates an example of a flat network configuration in accordance with the invention.

Referring to FIG. 3, an example of an IT-OT configuration 300 in accordance with the invention is shown. The IT-OT configuration 300 includes a control network 310 and a device network 320. The control network 310 includes a main computer system 311 and a Layer 2 switch 312. The device network includes two field devices 323, 324, a primary PLC 321 and a primary switch 326, and a secondary PLC 322 and a secondary switch 327. In this example the switches are shown as separate devices, in other examples they may be respectively integrated within the primary and secondary PLCs 321, 322. The primary PLC 321 and switch 326, secondary PLC 322 and switch 327, and field devices 323, 324 are connected in a daisy chain loop topology. Apart from the connections for the control network, the PLCs are also connected over a dedicated connection 328, such as a redundant point-to-point fibre optics based connection, a backplane bus, a proprietary Ethernet link, or fieldbus.

The secondary PLC 322 is provided for reason of redundancy in case the primary PLC 321 should fail and aims to facilitate high availability of the control system. This is referred to as a high-availability system with a hot-standby configuration, meaning that both PLCs 321, 322 are both powered on, but that only one actually executes applicable programs. In case of the primary PLC 321 failing, a failover process will be initiated to have the secondary PLC 322 take over execution of the applicable program. Detection of failure may include the use of e.g. a heartbeat signal or other know means for monitoring operation. In addition, during normal operation active data of the primary PLC 321 is usually exchanged with the secondary PLC 322 to ensure that it can take over execution of the applicable programs at once on failover. In the example of FIG. 3, the high-availability system is considered hot-standby as a redundant PLC is already operational and provided with current valid data. In other examples, the configuration may be warm- or cold-standby wherein e.g. data for the redundant PLC first needs to actualized or when the redundant PLC first needs to be started up in case of failover.

The control network 310 and device network 320 are connected via two separate connections i.e. links between Layer 2 switch 312 and switches 326, 327; one primary link between switch 312 and primary switch 326 and one secondary link between switch 312 and secondary switch 327. This increases the level of redundancy and reduces the amount of complex, intelligent, expensive equipment required.

The device network 320 uses one of the known industrial protocol, such as Modbus, whereas the control network 310 uses a common IT protocol over IEEE 802.3 Ethernet. As mere switches 326, 327 operating at the data link Layer 2 according to the OSI model are used instead of a more intelligent gateway operating at the network Layer 3 according to the OSI model, and because of the daisy chain loop topology, the risk of a broadcast storm is present.

Therefore, the secondary PLC 322 is arranged for logically enabling and disabling the port 327a of the secondary switch 327 that is connected to the switch 312 of the control network 310. Preferably, secondary PLC 322 is also arranged for logically enabling and disabling the port 326a of the primary switch 326. The latter foremostly applies to configurations with switches external of the PLCs. Hence, secondary PLC 322 controls the operation of secondary switch Ethernet port 327a. And preferably also primary switch Ethernet port 326a. Logically enabling or disabling of one port may be established e.g. by controlling the MAC-database of the respective switch or other relevant registers.

Note that the primary and secondary link between switches 326, 327 and Layer 2 switch 312 may both be linked up, while for only one of the switches 326, 327 a logical connection is enabled.

Figure 4:
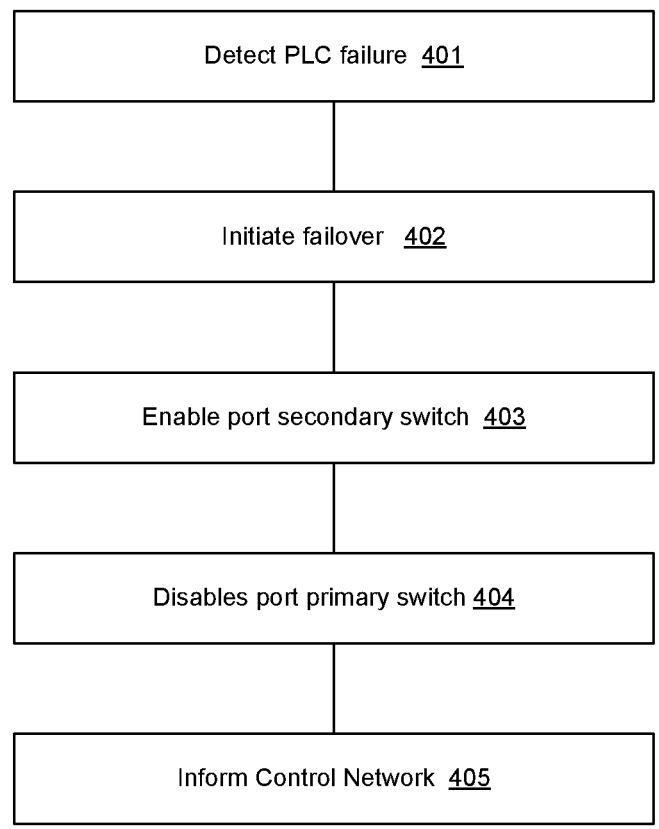
FIG. 4 illustrates an example of a method in accordance with the invention.

Thus, while referring to FIG. 4, in case failure of the primary PLC 321 is detected 401, a failover process is initiated 402 and the Ethernet port of the secondary switch is enabled 403 and the Ethernet port of the primary switch is disabled 404. The method may further include informing 405 the control network that a failover process has been concluded.

More in general, if the failure is of a software or logical nature such as due to faulty calculation or user command, a failed PLC may go in a fall back or safe state as defined by a user. In other examples it could be that a failed PLC may reset itself. In addition, it may also reset the primary switch. Thereafter, it may function as secondary PLC in hot-standby. Or it may initiate a process to become the primary PLC again. If the failure is of a hardware nature, an alert needs to be send in order to allow an operator to undertake replacement of the defective device.

As will be understood, once the failover process is finished and the secondary PLC standing by has taken over the function and tasks, the secondary PLC will operate as the primary PLC. And once the failure of the formerly primary PLC is remedied, the formerly primary PLC may start to operate as the secondary PLC.

Apart from failure of the primary PLC 321 itself, also the primary switch 326 or the primary link to the switch 312 may fail. In order to monitor such, the primary and secondary PLCs 321, 322 may use e.g. the Simple Network Management Protocol SNMP for monitoring the switches 326, 327 and their links to switch 312. Accordingly, a failure in the primary connection, either switch or link, may be detected by the primary PLC and which primary PLC may decide to commence the failover process. Hence, it may occur that either primary PLC 321 or secondary PLC 322 or both PLCs 321, 322 may decide to initiate the failover process. More in general, this depends on the state of each PLC, where they operate as peers to one another.

In general, a hub or switch may learn the network it is operating in by storing each source MAC-address as mentioned in an incoming frame received on a particular port; thereby creating a MAC database associating ports and MAC addresses. If the destination MAC-address is not yet known in the database, an incoming frame is flooded to all other ports of the switch, excluding the one port on which the incoming frame was received. As usually only one device will respond, and mention its' source MAC-address, a new association of port and MAC-address may be stored. In case a physical loop is present, an incoming frame will be send via one or more ports but also be incoming again due to the loop. When the frame is re-send again, repeatedly, the frame will be cycling the loop, reducing capacity until eventually the switch starts dropping frames and becomes unreliable.

Figure 1:
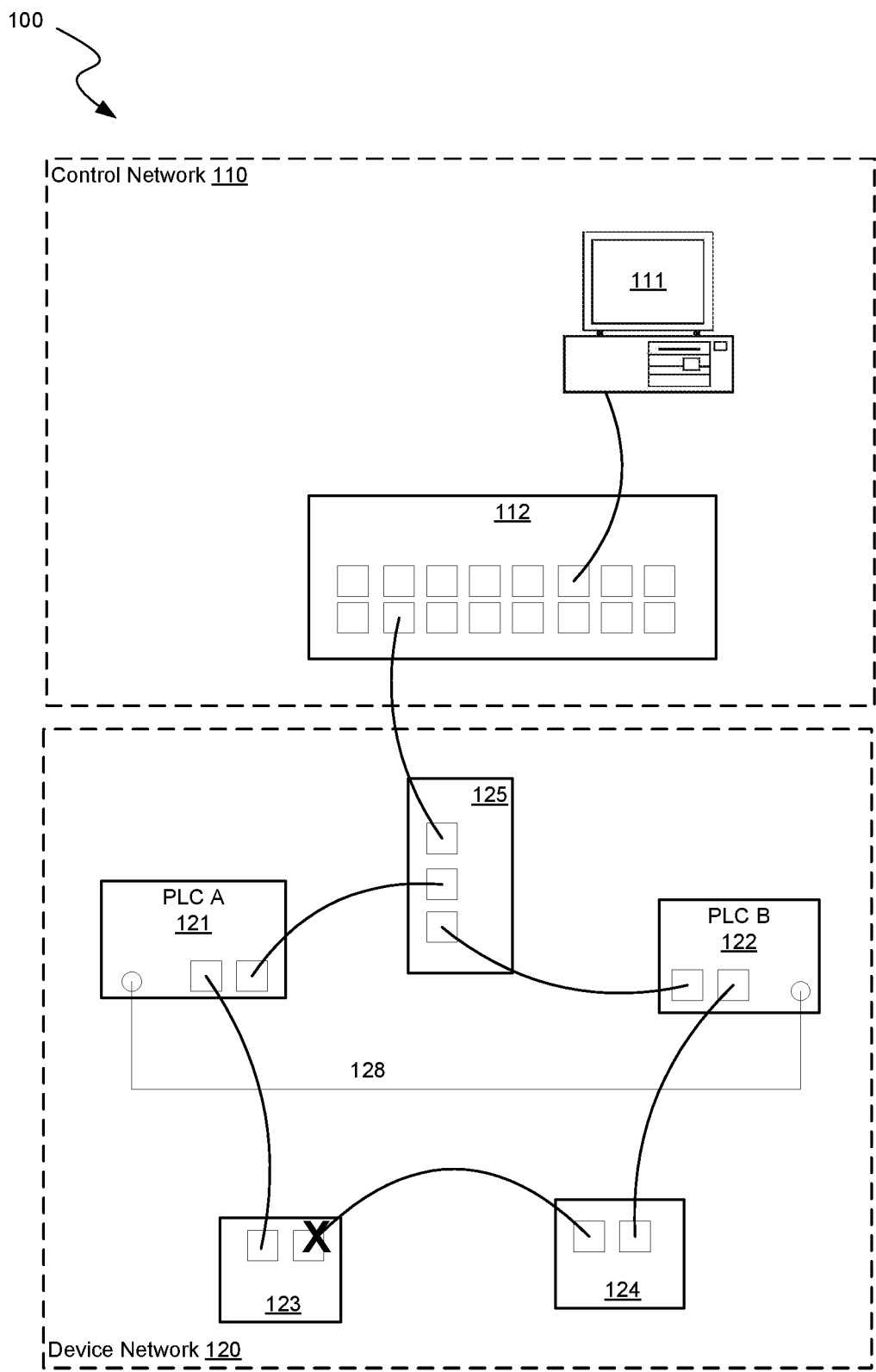
FIG. 1 illustrates schematically a prior art example of a flat network configuration.
Figure 2:
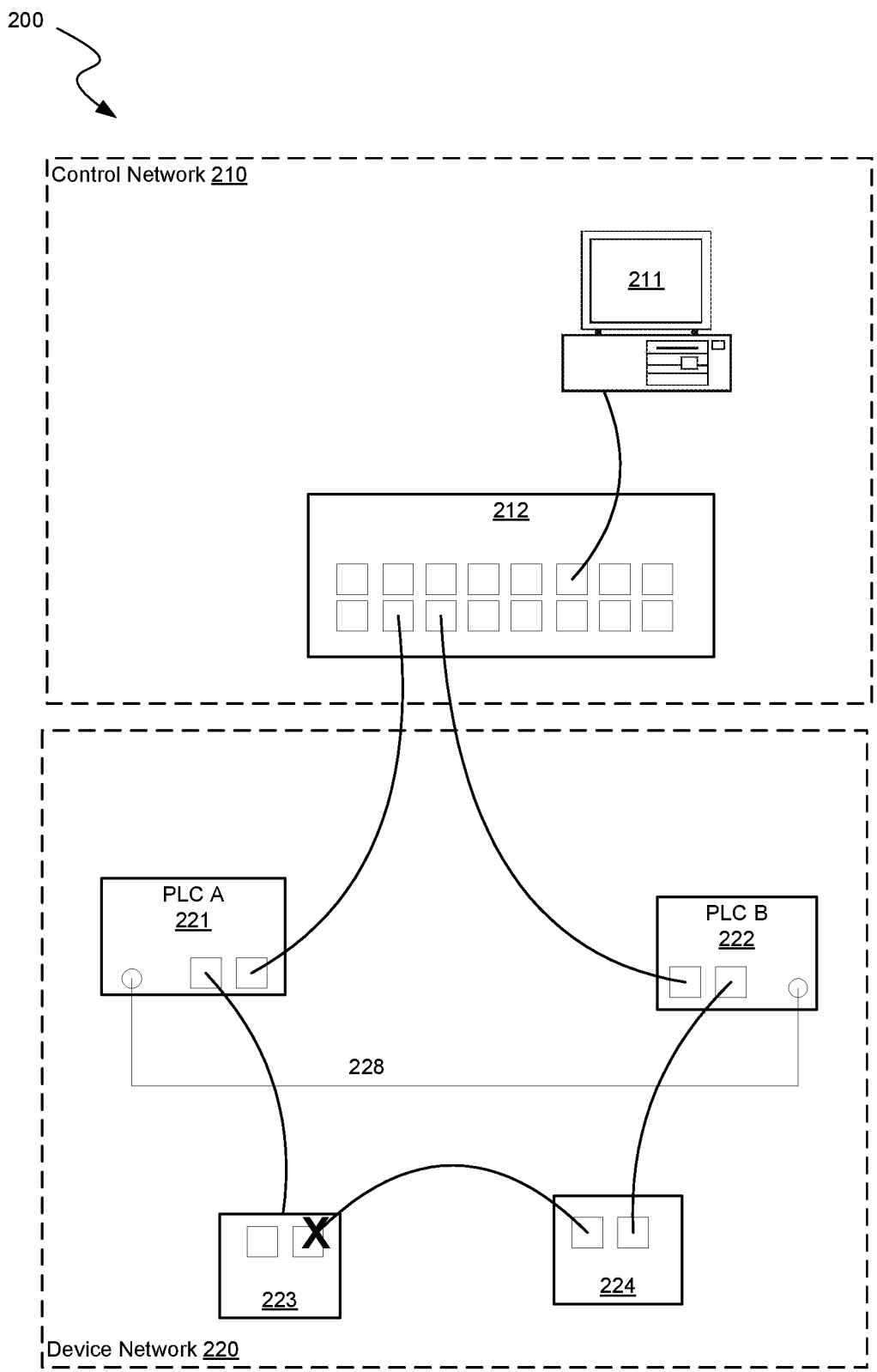
FIG. 2 illustrates schematically another prior art example of a flat network configuration.

As with the example of FIG. 2, a Spanning Tree Protocol or loop detection protocol might be applied. However, it would once again introduce similar risks of network segment isolation and cyber security. Moreover, such Spanning Tree Protocols may operate too slow in large, more complex infrastructures.

Accordingly, configuring at least the secondary PLC, or both the primary and secondary PLC, to be able to logically enable and disable ports of respective switches allows prevention of broadcast storm. And it eliminates the need for further measures, in means of protocols, management and/or more intelligent, expensive devices. In this manner a simple, managed switch operating at the data link Layer 2 according to the OSI model may be used for enabling a secondary link to improve redundancy.

The IT-OT flat network configurations and methods as disclosed increase redundancy for single fault occurrence, meaning only one of the links between IT, the control network 310, and OT, the device network 320, failing. Dual fault occurrence, meaning both links failing simultaneously, though not very likely, may be addressed of course by extending the number of links between IT and OT networks.

Depending on the set-up i.e. configuration and equipment used, the secondary PLC 322 may use several different manners to configure the switch port 327a, as will be explained below.

1. Use of Port-Based Network Access Control Protocol, such as IEEE 802.1X:

Port-based network access control is used to allow only certain traffic on a particular port, basically only traffic relating to an authentication protocol, all other traffic is blocked. For IEEE 802.1X for example, this requires a supplicant that wants to connect, in the example of FIG. 3 switch 312, a authenticator that acts as a guard, in FIG. 3 secondary switch 327, and an authentication server, secondary PLC 327 in FIG. 3, that validates the credentials of the supplicant, being switch 312. If the failover process is initiated, the port 327a of the secondary switch 327 to which switch 312 is linked will be enabled by validation of the credentials of switch 312.

2. Use a Proprietary Protocol for Configuring a Switch Remotely.

Some network device manufactures provide proprietary protocols for remotely configuring network equipment. For example, such a proprietary protocol may use Ethernet frames for transmitting new settings. In that case, the equipment is provided with dedicated hardware for processing the remote commands included in the transmitted Ethernet frames; in response to which the settings of the network device are adapted.

3. Use of PLC with Integrated Switch

In case a switch is integrated with a PLC, the PLC may directly read & write into the switch's Integrated Circuit IC registers. Accordingly, on failover the secondary PLC may change the logical setting of the secondary switch port by enabling it in the registry. As in such a configuration, failure of the primary PLC also affects the primary switch, the primary switch may not need to be disabled.

In the above examples described in relation to FIG. 3, programmable Logic Controllers PLC acted as control devices. In other examples, other suitable control devices such as Programmable Automation Controllers (PACs) or embedded controllers may be deployed.

While in the above examples described in relation to FIG. 3, the control devises 321, 322 may be functionally identical, it may be understood that different types of control devices may be deployed within the same device network. For example, the secondary control device having an integrated switch with a primary control device configured to use Ethernet frames or port based network access control for enabling and disabling the port of the primary switch. Hence, regardless of the particular type of control device and switch, a flat network architecture with a redundant connection between the device network and control room network is preserved.

As disclosed above, the primary and secondary switch may be integrated in the primary and secondary control device respectively. In further embodiments, the primary and secondary switch may be integrated together in one control device, either the primary or secondary control device. When such a control device is used in the device network, the control device may be configured to enable and disable ports of both the primary switch and the secondary switch.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A system for controlling a redundant connection in a flat network architecture, comprising:
   at least two field devices;
   a primary control device connected to a primary switch by a first port of the primary switch;
   a secondary control device connected to a secondary switch by a first port of the secondary switch;
   wherein the primary control device and switch, secondary control device and switch, and the at least two field devices are all connected together in a daisy chain loop topology using connections between the primary control device and the primary switch, the secondary control device and the secondary switch, the primary switch and the secondary switch, the primary control device and a first field device of the two field devices, the secondary control device and a second field device of the two field devices, and the first and second field device;
   wherein an Ethernet port of the primary switch is connected to a control room switch via a first connection, and an Ethernet port of the secondary switch is connected to the control room switch via a second connection that is separate from and provided for redundancy of the first connection, wherein the control room switch, the primary switch, and the secondary switch use Layer 2 of the Open Systems Interconnection (OSI) model for the first and second connections; and
   wherein the secondary control device is configured to:
   operate in standby mode for the primary control device;
   detect failure of the primary control device;
   initiate failover; and
   enable the Ethernet port of the secondary switch, wherein the Ethernet port of the secondary switch is connected by the second connection via the control room switch to a control system.

2. The system according to claim 1, wherein the primary control device is configured to enable and disable an Ethernet port of the primary switch.

3. The system according to claim 1, wherein the secondary and/or primary control device is configured to enable and disable the Ethernet port via port-based network access control protocol.

4. The system according to claim 1, wherein the secondary and/or primary control device is configured to enable and disable the Ethernet port via a proprietary protocol for remote configuring of network equipment.

5. The system according to claim 4, wherein the proprietary protocol for remote configuring of network equipment comprises Ethernet frames for transmitting commands and/or configuration settings.

6. The system according to claim 1, wherein the secondary switch is integrated in the secondary control device; and/or
wherein the primary switch is integrated in the primary control device.

7. The system according to claim 6, wherein the secondary and/or primary control device is configured to write an IC register of the integrated switch, the IC register comprising configuration settings of the switch.

8. The system according to claim 1, wherein the primary and secondary switch are integrated in the secondary or primary control device.

9. The system according to claim 1, wherein both the primary control device and the secondary control device are powered on and only the primary control device executes applicable programs, and during normal operation active data of the primary control device is exchanged with the secondary control device.

10. A method for controlling a redundant connection in a flat network architecture comprising at least two field devices; a primary control device connected to a primary switch by a first port of the primary switch; a secondary control device connected to a secondary switch by a first port of the secondary switch, wherein the primary control device and switch, the secondary control device and switch, and the at least two field devices are all connected together in a daisy chain loop topology using connections between the primary control device and the primary switch, the secondary control device and the secondary switch, the primary switch and the secondary switch, the primary control device and a first field device of the two field devices, the secondary control device and a second field device of the two field devices, and the first and second field device, wherein an Ethernet port of the primary switch is connected to a control room switch via a first connection, and an Ethernet port of the secondary switch is connected to the control room switch via a second connection that is separate from and provided for redundancy of the first connection, wherein the control room switch, the primary switch, and the secondary switch use Layer 2 of the Open Systems Interconnection (OSI) model for the first and second connections, the method performed in the secondary control device, the method comprising:
operating in standby mode for the primary control device;
detecting failure of the primary control device;
initiating failover; and
enabling the Ethernet port of the secondary switch, wherein the Ethernet port of the secondary switch is connected by the second connection via the control room switch to a control system.

11. The method according to claim 10, further comprising the secondary control device being configured for:
disabling the Ethernet port of the primary switch.

* * * * *